United States Patent [19]

Peacock

[11] Patent Number: 5,448,389
[45] Date of Patent: Sep. 5, 1995

[54] PASSIVE OPTICAL RING NETWORK

[75] Inventor: John Peacock, Ipswich, England

[73] Assignee: British Telecommunications public limited company, London, England

[21] Appl. No.: 253,580

[22] Filed: Jun. 3, 1994

Related U.S. Application Data

[63] Continuation of Ser. No. 910,013, Jul. 16, 1992, abandoned.

[30] Foreign Application Priority Data

Dec. 22, 1989 [GB] United Kingdom ............... 8929113

[51] Int. Cl.⁶ .................................... H04B 10/20
[52] U.S. Cl. .................................... 359/119; 359/161
[58] Field of Search ............... 359/119, 127, 179, 161; 370/16.1

[56] References Cited

U.S. PATENT DOCUMENTS

| | | | |
|---|---|---|---|
| 3,710,026 | 1/1973 | Graham et al. | 179/15 |
| 4,287,592 | 9/1981 | Paulish et al. | 370/88 |
| 4,759,011 | 7/1988 | Hicks | 359/119 |

FOREIGN PATENT DOCUMENTS

| | | | |
|---|---|---|---|
| 0403029 | 12/1990 | European Pat. Off. | 359/119 |
| 0218243 | 1/1985 | German Dem. Rep. | 359/119 |
| 0234640 | 10/1986 | Japan | 359/119 |
| 0290826 | 12/1986 | Japan | 359/119 |
| 0204247 | 9/1991 | Japan | 359/119 |
| 2198903 | 6/1988 | United Kingdom | 359/119 |
| 2199209 | 6/1988 | United Kingdom | |

OTHER PUBLICATIONS

*Patent Abstracts of Japan*, vol. 5, No. 186, 25 Nov. 1981 & JP 56111338, 3 Sep. 1981 (Abstract).

*Electronics & Communications in Japan*, vol. 64, No. 11, Nov. 1981, "Studies on the Structure of Subscriber Line Systems-Application of Optical Fiber to Subscriber Line Systems", pp. 59-67.

*Proceedings Comp. Con '80*, 23-25 Sep. 1980, IEEE, Paulish, "A fail-soft distributed processing system," pp. 179-184 PCT International Search Report.

*Primary Examiner*—Leslie Pascal
*Attorney, Agent, or Firm*—Nixon & Vanderhye

[57] ABSTRACT

An optical ring mesh network includes a plurality of optical rings, each of which is coupled to at least one other ring by a respective optical coupler. The rings are provided with a plurality of input/output nodes constituted by optical couplers. The nodes are so positioned, and are of such a number, that the optical path length between any given pair of nodes includes n couplers where n is less than the number of nodes.

12 Claims, 3 Drawing Sheets

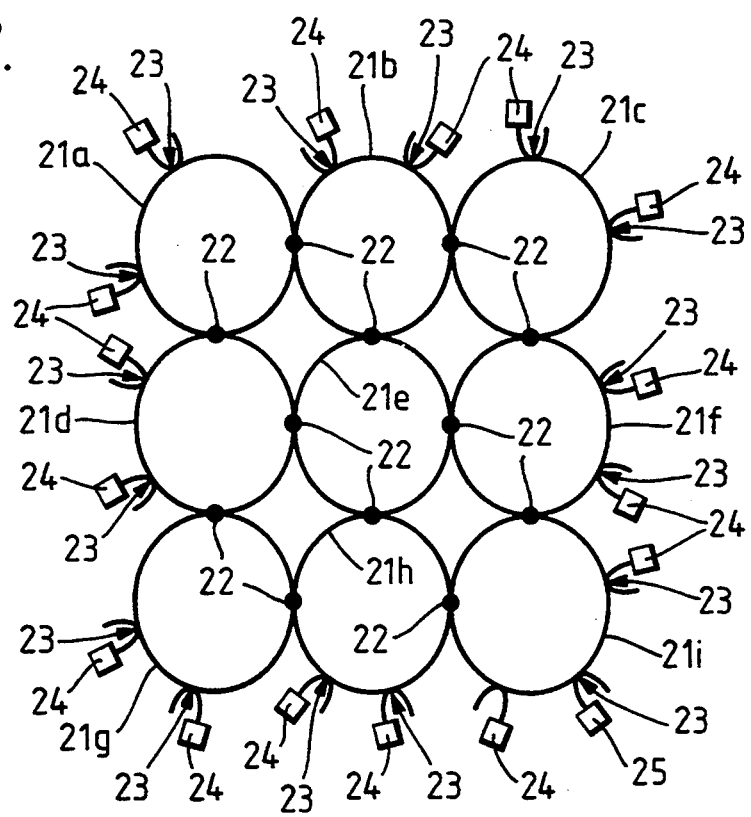
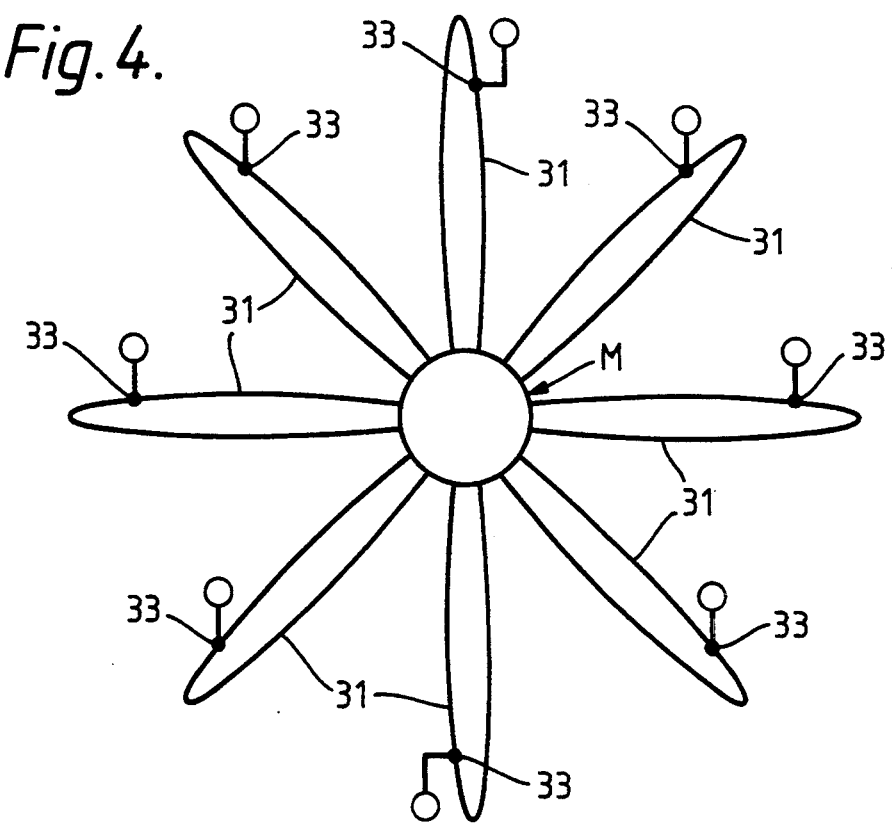

PASSIVE OPTICAL RING NETWORK

This is a continuation of application Ser. No. 07/910,013, filed Jul. 16, 1992, now abandoned.

BACKGROUND OF THE INVENTION

1. Field of the Invention

This invention relates to a passive optical ring network, and in particular to a passive optical ring network for use in an in-station telecommunications environment, or for use in a local area network (LAN), a wide area network (WAN), or a metropolitan area network (MAN).

2. Related Art

In a typical in-station environment, such as a trunk repeater station, telecommunications signals are fed into tributary cards at 2 Mb/s from local exchanges. These signals are then passed to an 8 Mb/s muldex (multiplexer/demultiplexer), from where they pass to a 140 Mb/s muldex via a 34 Mb/s muldex. At each stage, eight interconnections and 16 point-to-point co-axial links are required, and this gives rise to termination problems on the associated cards.

In order to reduce the number of interconnections and point-to-point links, it is known to use a passive optical ring of the type shown in FIG. 1, this figure showing how such a ring can provide the necessary interconnections between four tributary cards 1 and an 8 Mb/s muldex 2. Thus, each of the cards 1 and the muldex 2 is connected to a passive optical ring 3 by a respective passive 50/50 optical coupler 4. In this way, the cards 1 are connected to the muldex 2 by a ring (the passive optical ring 3) having only five nodes (the couplers 4), and this leads to a substantial reduction in the number of terminations on the card associated with the muldex 2.

As a trunk repeater of this type only carries traffic at 2 Mb/s and 140 Mb/s (signals come in at 2 Mb/s from the local exchanges, and go out over the trunk network at 140 Mb/s), the 8 and 34 Mb/s muldexes generally carry no traffic, and so are surplus to requirements from the point of view of traffic management. In modern trunk repeater stations, therefore, it would be advantageous to feed 2 Mb/s tributary cards directly to the 140 Mb/s muldex.

With standard co-axial interconnections, this would cause severe termination problems, as 128 point-to-point links would be required to serve 64 2 Mb/s tributaries. Moreover, the passive ring topology of the type described above with reference to FIG. 1 would not work, as such a ring could not support the required number of nodes. Thus, assuming edge emitting light Emitting diodes (ELEDs) are used to launch power into the couplers 4, and the couplers are associated with receivers of sensitivity −52 dB, the optical power budget (that is to say the difference between receiver sensitivity and launch power into a fibre at a coupler) of the ring of FIG. 1 can support only five nodes. This is because the launch power of the ELEDs is −26 dB (giving an optical power budget of 26 dB), there is a loss of −4 dB at each coupler 4, and typically there are fibre and connection losses of −2.5 dB. Clearly, therefore, this ring topology cannot cope with the 64 node terminations required.

It would be possible to increase the number of nodes such a ring would support up to 15, by using lasers instead of ELEDs, and by using receivers of better sensitivity. The disadvantage of such an arrangement would be its high cost; and, even then, it could not provide the required 64 node terminations. A further increase to 33 nodes would be possible if the 50/50 couplers were replaced by 90/10 couplers, and the network configured to give minimum path loss between all the tributaries and the muldex, but this would have the additional disadvantage of dictating which node is a transmitter and which is a receiver. Consequently, this arrangement could not be used for duplex operation, and so is unlikely to meet all the future needs of the in-station environment. Moreover, the required target of 64 node terminations would still not be met. If the 90/10 couplers were used symmetrically, however, only 26 node terminations would be possible, due to an 11 dB loss which would occur at each coupler because both transmission and receive nodes would be present.

SUMMARY OF THE INVENTION

The present invention provides a passive optical ring mesh network comprising a plurality of optical rings, each of which is coupled to at least one other ring by a respective optical coupler, the rings being provided with a plurality of input/output nodes constituted by optical couplers, wherein the nodes are so positioned, and are of such a number, that the optical path length through any given pair of nodes. includes n couplers where n is less than the number of nodes.

Advantageously, each ring is coupled to at least two other rings by means of respective optical couplers, and the rings include a generally rectangular (and preferably square) configuration portion.

The rings may include a 2×2 square configuration portion, in which case the rings are provided with at least 4 nodes. Preferably, however, the rings include a 3×3 square configuration portion, in which case there are at least 7 nodes. When a mesh network has more than 13 nodes, the 3×3 square configuration begins to show advantages over the 2×2 square configuration.

Conveniently, each of the optical couplers is a passive 50/50 optical coupler. One of the nodes may be an output node, and each of the other nodes may be an input node. Advantageously, a respective ELED or low-cost laser is associated with each of the input nodes.

BRIEF DESCRIPTION OF THE DRAWINGS

The invention will now be described in greater detail, by way of example, with reference to the accompanying drawings, in which:

FIG. 3 is a schematic representation of a second form of in-station passive optical ring mesh network according to the invention;

FIG. 4 is a schematic representation of a practical realisation of the second form of in-station passive optical ring mesh network according to the invention:

DETAILED DESCRIPTION OF EXEMPLARY EMBODIMENTS OF THE INVENTION

Figure 2:
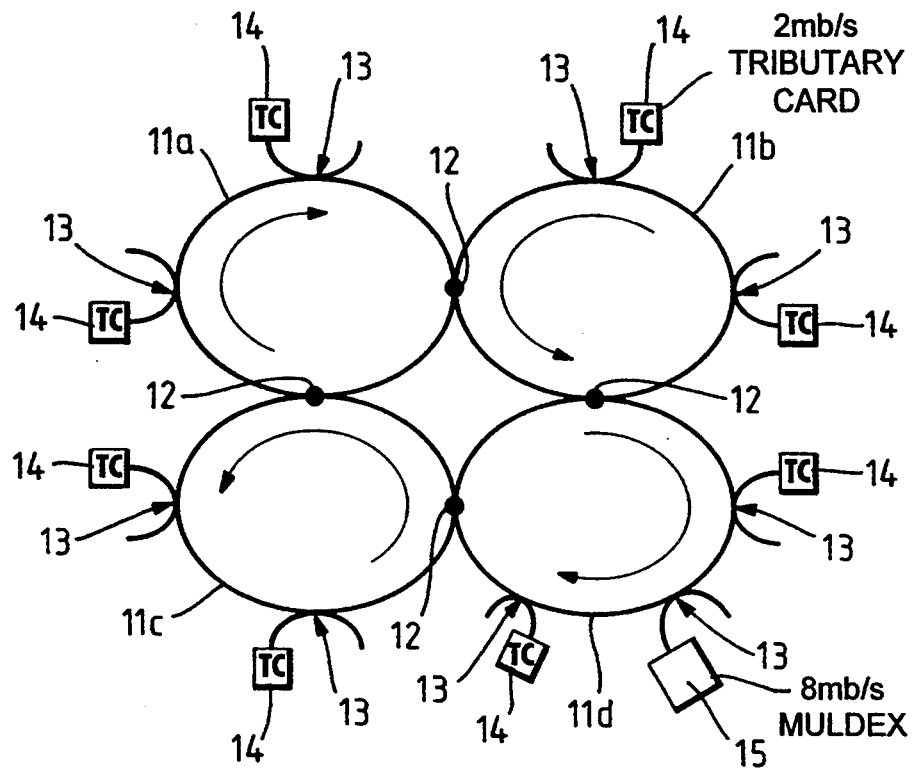
FIG. 2 is a schematic representation of a first form of in-station passive optical ring mesh network according to the invention.

Referring to the drawings, FIG. 2 shows a 2×2 optical ring mesh network. This network has four rings, 11a, 11b, 11c and 11d, arranged in a 2×2 square configuration. Each ring is coupled to the two adjacent rings by respective passive 50/50 optical couplers 12. Each of the rings 11a to 11d is provided with two passive 50/50 optical couplers 13, each of which is associated with a respective 2 Mb/s tributary card 14. The ring 11d is also provided with a passive 50/50 optical coupler 13, which is associated with an 8 Mb/s muldex 15. Each coupler 13 has two arms, a respective ELED (not shown) being connected to each of the arms associated with a tributary card 14 for launching optical power into the associated ring 11a, 11b, 11c or 11d, and a receiver (not shown) being connected to the arm associated with the muldex 15. The other arms (coupler tails) of the couplers 13 are formed with terminated ends, that is to say they do not reflect light significantly, so that cross-talk is minimised, thereby ensuring correct receiver operation.

By studying the possible propagation paths through this mesh network, it can be seen that its end-to-end loss is less than that of a conventional ring. This is because the maximum number of passive optical couplers 12, 13 in any given optical path from a tributary card 14 to the muldex 15 is less than (or equal to—for paths having a small number of nodes) that of a conventional ring, so that (in the case of long optical paths) there is a reduced end-to-end loss due to a reduction in the loss through the couplers. Thus, in the embodiment of FIG. 2, the maximum number of couplers 12, 13 in any optical path is six, whereas the maximum number of couplers in any optical path in a conventional ring supporting eight tributary cards and a muldex would be nine. Consequently, a saving of 12 dB in power loss is possible with the optical ring mesh network of FIG. 2 when compared with a conventional optical ring. Without selective positioning of the receive node (the muldex 15), a saving of only 8 dB in power loss is possible. Obviously, the rings 11a, 11b, 11c and 11d could be provided with additional couplers 13 for additional tributary cards 14, in which case larger optical power savings would be possible. Thus, for 16 nodes (with no selective positioning) distributed over the four rings 11a to 11d, the maximum number of couplers in any optical path would be ten (compared with a maximum of 16 for a conventional ring).

It will be apparent that the optical ring mesh network described above permits the use of larger number of nodes (couplers) for a given optical power budget than is possible with the conventional ring structure. In fact, by boosting the power of the ELEDs used, it is possible to use the mesh network of FIG. 2 with a standard receiver of sensitivity −52 dB, provided the total loss at each coupler can be reduced to 3.5 dB by appropriate choice of couplers and interconnection techniques. In this case, a total of 8 mesh networks of the type shown in FIG. 2 would be required to connect 64 2 Mb/s tributary cards to a 140 Mb/s muldex. This is to be compared with the 32 conventional rings of the type shown in FIG. 1 which would be needed. This could be reduced to 8 mesh networks by the use of duplex operation over the network.

Of course, by increasing the size of the mesh network, a reduction in the number of networks needed would result. For example, the use of mesh networks each having nine rings in a 3×3 configuration would entail the use of only eight networks to achieve the desired result. A 3×3 configuration mesh network is shown in FIG. 3, this network having nine rings 21a to 21i. Each of the rings 21a to 21i is coupled to at least two other rings by respective passive optical couplers 22. Each of the outer rings 21a to 21d and 21f 21i is provided with two passive optical couplers 23, each of which is associated with a respective 2 Mb/s tributary card 24. The ring 21i is also provided with a passive 50/50 optical coupler 23 which is associated with a 2 Mb/s intermediate tributary card 25. Each coupler 23 has two arms, a respective ELED (not shown) being connected to each of the arms associated with a tributary card 24 for launching optical power into the associated ring, and a receiver (not shown) being connected to the arm 23a associated with the intermediate tributary card 25. The other arms (coupler tails) of the couplers 23 are formed with terminated ends, thereby minimising cross-talk.

By studying the possible progapation paths through this mesh network, it will be apparent that it is possible to go from any tributary card 24 to the tributary card 25 without passing through a coupler 23 of any of the rings 21a to 21i except the couplers 23 on the two rings associated with those two tributary cards. Consequently, this network has a reduced end-to-end loss compared to that of a conventional ring. Another advantage of this configuration is that a break in any one of the rings will not prevent transmission of signals across the network because the mesh network provides alternative routes between each pair of nodes.

Figure 1:
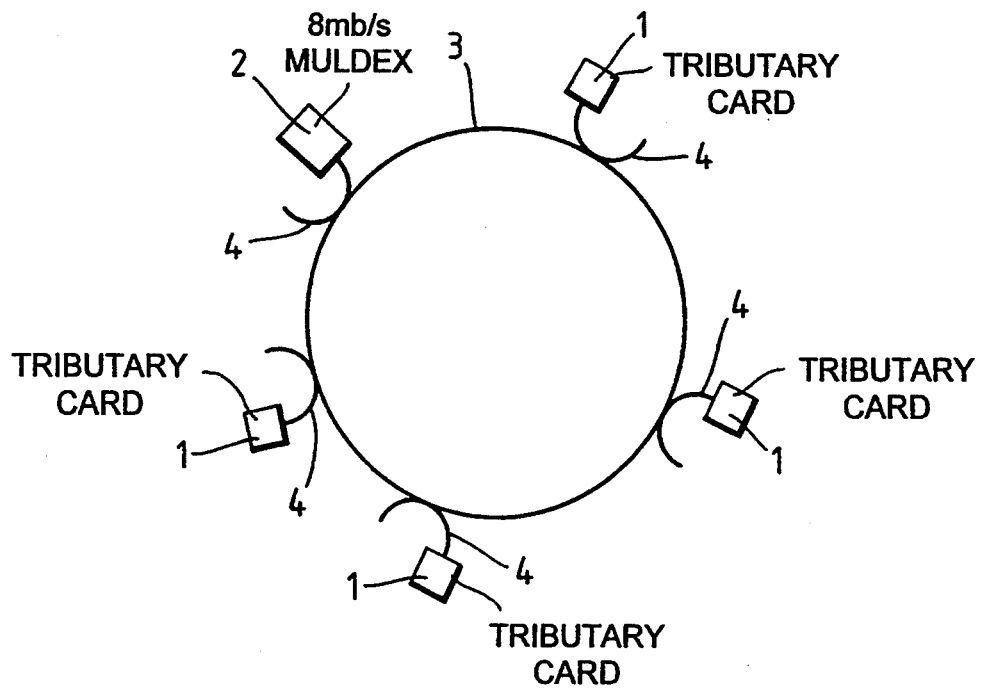
FIG. 1 is a schematic representation of a known in-station passive optical ring.

The table below gives a breakdown for the end-to-end loss, and the number of couplers required, for a 2×2 mesh ring (FIG. 2) and a 3×3 mesh ring (FIG. 3) compared with that of a conventional ring (FIG. 1). In this table, no selective positioning of the receive node is assumed, i.e. the loss given is the maximum for any node to any node on the network. It is also assumed that 50/50 couplers having a 1dB excess and splicing loss are used.

| CONVENTIONAL RING | | 2 × 2 RING MESH | | POWER SAVING 2 × 2 dB | 3 × 3 RING | | POWER SAVING 3 × 3 dB |
|---|---|---|---|---|---|---|---|
| No Nodes | Max Loss dB | No Nodes | Max Loss dB | | No Nodes | Max Loss dB | |
| 1 | 4 | — | — | | — | | |
| 2 | 8 | 4 | 16 | −8 | 7 | 28 | −20 |
| 3 | 12 | 4 | 16 | −4 | 7 | 28 | −16 |
| 4 | 16 | 4 | 16 | 0 | 7 | 28 | −12 |
| 5 | 20 | 5 | 20 | 0 | 7 | 28 | −8 |
| 6 | 24 | 6 | 24 | 0 | 7 | 28 | −4 |
| 7 | 28 | 6 | 24 | +4 | 7 | 28 | 0 |
| 8 | 32 | 6 | 24 | +8 | 7 | 28 | +4 |
| 9 | 36 | 7 | 28 | +8 | 8 | 32 | +4 |

-continued

| CONVENTIONAL RING | | 2 × 2 RING MESH | | POWER SAVING | 3 × 3 RING | | POWER SAVING |
|---|---|---|---|---|---|---|---|
| No Nodes | Max Loss dB | No Nodes | Max Loss dB | 2 × 2 dB | No Nodes | Max Loss dB | 3 × 3 dB |
| 10 | 40 | 8 | 32 | +8 | 9 | 36 | +4 |
| 11 | 44 | 8 | 32 | +12 | 9 | 36 | +8 |
| 12 | 48 | 8 | 32 | +16 | 9 | 36 | +12 |
| 13 | 52 | 9 | 36 | +16 | 9 | 36 | +16 |
| 14 | 56 | 10 | 40 | +16 | 9 | 36 | +20 |
| 15 | 60 | 10 | 40 | +20 | 9 | 36 | +24 |
| 16 | 64 | 10 | 40 | +24 | 9 | 36 | +28 |
| 17 | 68 | 11 | 44 | +24 | 10 | 40 | +28 |
| 18 | 72 | 12 | 48 | +24 | 11 | 44 | +28 |
| 19 | 76 | 12 | 48 | +28 | 11 | 44 | +32 |
| 20 | 80 | 12 | 48 | +32 | 11 | 44 | +36 |
| 21 | 84 | 13 | 52 | +32 | 11 | 44 | +40 |
| 22 | 88 | 14 | 56 | +32 | 11 | 44 | +44 |
| 23 | 92 | 14 | 56 | +36 | 11 | 44 | +48 |
| 24 | 96 | 14 | 56 | +40 | 11 | 44 | +52 |

Figure 5:
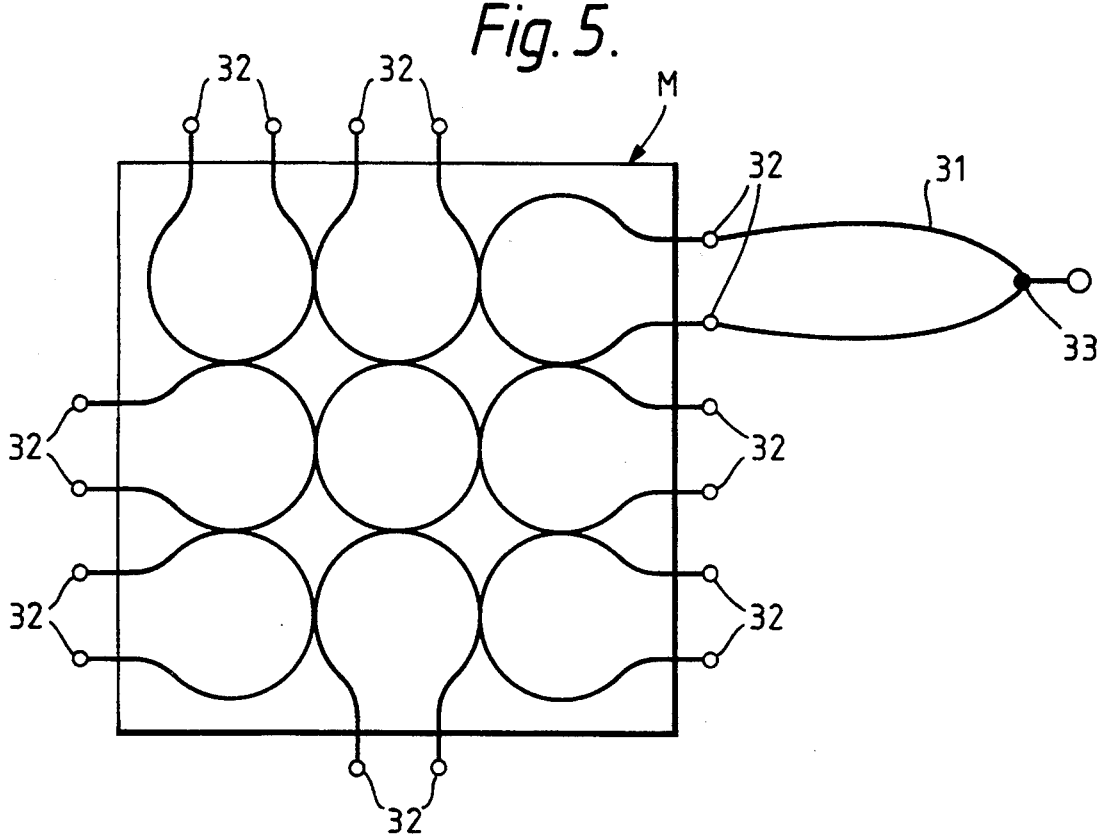
FIG. 5 is a schematic representation, on an enlarged scale, of part of the network of FIG. 4.

FIGS. 4 and 5 show a practical realisation of the network of FIG. 3. Thus, the arrangement has a central 3×3 mesh network M (see FIG. 5) housed in a box, the network being coupled to eight outer rings 31 (see FIG. 4). Each of the rings 31 (one of which is shown in FIG. 5) is coupled to a respective outer ring of the network M by the output legs 32 of a respective passive 50/50 optical coupler (not shown) positioned within the box, and each ring 31 is provided with a node constituted by a passive 50/50 optical coupler 33. An additional advantage of this arrangement is the reduction in the possibility of cross talk due to multiple path propagation.

In general, therefore, where a network has 1 to 4 nodes, it is preferable to use a conventional ring with 50/50 couplers; where a network has 5 to 12 nodes, it is preferable to use a 2×2 square configuration ring mesh network; and, where a network has 13 or more nodes, it is preferable to use a 3×3 square configuration ring mesh network.

It is possible to evaluate the loss for the optical path length through any two nodes on a ring mesh network of this type. Unfortunately, the analysis is different for different (e.g. rectangular, square or triangular) configurations. The analysis for square configurations (which seem to be the most useful) is as follows. For the purpose of the analysis, it is assumed that all nodes are coupled only to the outer rings o f the network, and that all point-to-point (primary) propagation paths are via internal rings, that is to say a primary path is defined as a path which gives minimum loss without transmission through an intermediate outside ring. As a 2×2 ring mesh network has no internal communicating ring, this analysis does not apply to this network. Given these conditions are maintained, then the maximum optical loss (L) through any two nodes is given by:

$$L = (N_T + N_R + X) \times \text{coupler loss}$$

where
$N_T$ = number of nodes on transmitting ring;
$N_R$ = number of nodes on receiving ring; and
$X$ = number of couplers in primary propagation path.
$X$ is dependent upon the order of the ring mesh network. (3×3, 4×4, 5×5 ... A×A), and is given by:
$$X = (A + A - 1)$$

where A = ring size factor, i.e. 3, 4, 5 ... e.g. if A=7, the ring mesh is 7×7 and X=13

Thus for the 3×3 ring mesh network of FIG. 3, the maximum optical loss L = (2+3+5) × coupler loss = 10 × coupler loss and the coupler loss = 3 dB (for a 50/50 coupler) + excess loss + splice loss = 4 dB typically Therefore, L = 40 dB This loss of 40 dB (which is a worst loss case) should be compared with the maximum loss of 68 dB which would result from using a conventional ring having seventeen nodes.

Figure 6:
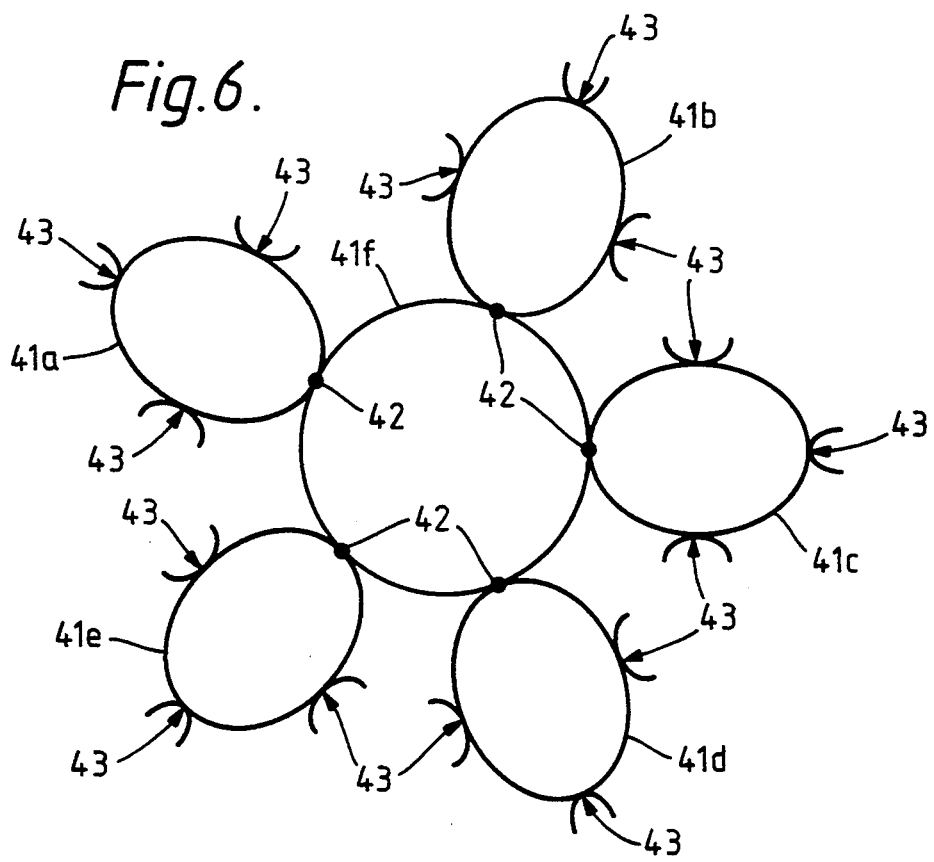
FIG. 6 is a schematic representation of a third form of in-station passive optical ring mesh network according to the invention.

FIG. 6 shows a further ring mesh configuration (a star configuration), in which five outer rings 41a to 41e are each coupled to a single central ring 41f by means of a respective passive 50/50 optical coupler 42. Each outer ring 41a to 41e has three nodes, each of which is constituted by a passive 50/50 optical coupler 43. One of the couplers 43 is associated with an optical receiver (not shown), the others being associated with ELEDs (not shown). This configuration is, therefore a 15 node ring mesh network.

By studying the propagation paths through this network, it will be apparent that the maximum number of couplers 42, 43 in any node-to-node path is 3 (the number of couplers 43 in the transmitting ring) + 3 (the number of couplers 43 in the receiving ring) + 5 (the maximum number of couplers 42 in the central ring 41f). This number of couplers (11) is less than the maximum number (15) for a conventional ring having 15 nodes, so again this mesh network has a smaller maximum optical loss than a conventional ring. An additional advantage of the star configuration is the ease with which outer rings can be added to (or withdrawn from) the configuration, thereby enhancing the flexibility of the arrangement.

It will be apparent that the invention would be modified in many ways. In particular, there are many different forms of ring mesh network which would be used to give a reduced maximum optical path loss as compared with conventional optical rings. For example, networks having rings arranged in triangular or rectangular configurations are possible. Moreover, ring mesh networks of the type described above will have many other uses than that mentioned above. For example, such networks could be used in LANs, WANs, and MANs.

I claim:
1. An optical communication network comprising:
   a passive optical ring mesh network including a plurality of closed optical fibre loops, each loop being interconnected with at least two other loops by respective optical couplers, the loops being provided with a plurality of input-/output nodes constituted by optical couplers, the nodes being so positioned, and of such a number, that the optical path length through any given pair of nodes includes n couplers where n is less than the number of nodes.

2. A mesh network as in claim 1, wherein the loops include a generally rectangular configuration portion.

3. A mesh network as in claim 2, wherein the loops include a generally square configuration portion.

4. A mesh network as in claim 3, wherein the loops include a 2×2 square configuration portion.

5. A mesh network as in claim 3, wherein the combination of all the loops are provided with at least 4 nodes.

6. A mesh network as in claim 3, wherein the loops include a 3×3 square configuration portion.

7. A mesh network as in claim 6, wherein the combination of all the loops are provided with at least 7 nodes.

8. A mesh network as in claim 1, wherein each of the optical couplers comprises a passive 50/50 optical coupler.

9. A mesh network as in claim 1, wherein one of the nodes comprises an output node and each of the other nodes comprises an input node.

10. A mesh network as in claim 9, wherein a respective edge emitting light emitting diode (ELED) is associated with each of the input nodes.

11. A passive optical ring mesh network comprising a plurality of closed optical fibre loops, each of which is coupled to at least two other loops by respective passive optical couplers, the loops being provided with a plurality of input-/output nodes constituted by passive optical couplers, at least two different optical paths being provided between any pair of nodes, and the nodes being so positioned, and of such a number, that an optical path length of at least one of the optical paths between any given pair of nodes includes n couplers, where n is less than the number of nodes.

12. A passive optical ring mesh network comprising:

a plurality of closed optical fibre loops each of which is coupled to at least two other loops by respective passive optical couplers, the loops being provided with a plurality of input-/output nodes constituted by passive optical couplers, the nodes being so positioned, and of such a number, that an optical path length between any given pair of nodes includes n couplers, where n is less than the number of nodes, and there being at least two transmission paths between any two nodes thereby providing a secondary routing in case of failure of a transmission path.

* * * * *